United States Patent
McAvoy et al.

(10) Patent No.: US 7,779,855 B2
(45) Date of Patent: Aug. 24, 2010

(54) SYSTEMS AND METHODS FOR RAINWATER COLLECTION, IRRIGATION, AND CONSERVATION

(75) Inventors: Lois M. McAvoy, 1490 Vinery Ave., Cumming, GA (US) 30041; Jason A. Scanlon, Cumming, GA (US)

(73) Assignee: Lois M. McAvoy, Cumming, GA (US)

( * ) Notice: Subject to any disclaimer, the term of this patent is extended or adjusted under 35 U.S.C. 154(b) by 238 days.

(21) Appl. No.: 11/831,029

(22) Filed: Jul. 31, 2007

(65) Prior Publication Data

US 2009/0031625 A1 Feb. 5, 2009

(51) Int. Cl.
*A01G 27/02* (2006.01)
(52) U.S. Cl. .................. 137/120; 137/357; 210/170.3
(58) Field of Classification Search ............. 137/120, 137/357; 52/12, 16; 210/170.03; 251/369
See application file for complete search history.

(56) References Cited

U.S. PATENT DOCUMENTS

| | | | |
|---|---|---|---|
| 1,460,613 A * | 7/1923 | Sill | 137/373 |
| 4,345,468 A * | 8/1982 | Jackson | 73/326 |
| 4,386,484 A | 6/1983 | van Berne et al. | |
| 4,726,151 A * | 2/1988 | Vitale | 52/16 |
| 5,220,755 A | 6/1993 | Roles | |
| 5,490,538 A | 2/1996 | Marcel et al. | |
| 5,533,303 A | 7/1996 | Harvey | |
| 5,730,179 A | 3/1998 | Taylor | |
| 5,863,151 A | 1/1999 | Chapotelle | |
| 6,250,345 B1 * | 6/2001 | Allwein et al. | 141/86 |
| 6,526,699 B1 | 3/2003 | Foglio, Sr. | |
| 6,941,702 B1 | 9/2005 | Abrams et al. | |
| 6,966,333 B1 * | 11/2005 | Kuehneman | 137/357 |
| 7,025,879 B1 | 4/2006 | Ticknor | |
| 2005/0257433 A1 | 11/2005 | Dussault et al. | |
| 2006/0101723 A1 | 5/2006 | Baeta | |

FOREIGN PATENT DOCUMENTS

| | | |
|---|---|---|
| JP | 05171752 A2 | 7/1993 |
| JP | 11183236 A2 | 7/1999 |
| JP | 11200572 A2 | 7/1999 |
| JP | 11217855 A2 | 8/1999 |

\* cited by examiner

*Primary Examiner*—John Bastianelli
(74) *Attorney, Agent, or Firm*—Crose Law LLC; Bradley D. Crose (57) ABSTRACT

The technology described herein provides systems and methods for rainwater collection, irrigation, and water conservation. This technology is ideal for use when municipal water reservoirs are low and outdoor watering is restricted or altogether banned. The system includes a water holding reservoir mounted vertically and inconspicuously adjacent to a dwelling, a reservoir connector fluidly connecting the water holding reservoir to a gutter to receive rainwater, a water level indicator and volumetric scale, a water spigot for a garden hose, and a cleanout drain. In an alternative embodiment, the system includes a plurality of adjacent water holding reservoirs each being filled by a single reservoir connector fluidly connected to and located between each of the plurality of water holding reservoirs and the gutter, to provide rainwater to each of the plurality of water holding reservoirs from a single point in the gutter.

14 Claims, 11 Drawing Sheets

SYSTEMS AND METHODS FOR RAINWATER COLLECTION, IRRIGATION, AND CONSERVATION

FIELD OF THE INVENTION

The technology described herein relates generally to water holding systems and methods. More specifically, the technology described herein relates to systems and methods to capture and retain rainwater for subsequent usage. Additionally, this technology relates to systems and methods for water management, conservation, and irrigation.

BACKGROUND OF THE INVENTION

Water conservation has become increasingly important with recent changes in the climate. For example, drought conditions exist in many parts of the world, necessitating better utilization of existing water supplies and the utilization of alternative water sources and distribution solutions. When rainwater levels in municipal water reservoirs become low, many municipalities implement outdoor watering restrictions for homeowners and business owners. As rainwater lessons and water levels within municipal water reservoirs drop further, outright watering bans often are instituted, preventing any outdoor watering. Attempts to overcome such restrictions and bans, while at the same time not violating them, include collecting rainwater during actual rain showers for storage and subsequent distribution for watering lawns, flowers, gardens, and the like.

Water storage and distribution systems are known to consist essentially of familiar, expected, and obvious structural configurations, despite the plethora of designs encompassed by the crowded prior art which have been developed for the fulfillment of various objectives and requirements.

Over time a number of innovations have been developed relating to collecting, storing, and distributing rainwater for subsequent use. The following patents and published patent applications are representative of some of those innovations: U.S. Pat. No. 6,941,702, issued to Abrams et al., discloses a rainwater collection and dispensation system for economically conserving water usage by using collected rainwater. U.S. Pat. No. 5,220,755, issued to Roles, discloses a high pressure water distributor for downpipes. U.S. Pat. No. 6,966,333, issued to Kuehneman, discloses a rainwater collection device for collecting rainwater from a gutter for later usage. U.S. Pat. No. 5,533,303, issued Harvey, discloses a downspout water conservation diversion adaptor for insertion within the lower part of an upstanding downspout and selectively operable to divert water flowing downward through the downspout laterally outwardly of the adaptor and along a building wall outwardly beyond which a roof eaves projects for irrigation of ground vegetation disposed beneath the eaves. U.S. Pat. No. 6,526,699, issued to Foglio, Sr., discloses a water holding and dispersing apparatus for catching and retaining rainwater for later watering usage.

Other attempts to solve these and other problems include the following: U.S. Pat. No. 5,730,179, issued to Taylor, discloses a rainwater collection and distribution apparatus which includes a tank which includes a water entry portion, a water exit portion, and a water containment portion located between the water entry portion and the water exit portion. U.S. Pat. No. 7,025,879, issued to Ticknor, discloses a rainwater collection apparatus which stores rainwater until required, and includes at least one outlet for exporting rainwater. U.S. Pat. No. 4,386,484, issued to van Berne et al., discloses a process and device for collecting and maintaining fresh amounts of rainwater. U.S. Pat. No. 4,726,151, issued to Vitale, discloses a rain water leader/gutter adaptor which is adapted to siphon rain water from a gutter. U.S. Published Patent Application No. 2006/0101723, filed by Baeta, discloses a rainwater collection and diverging system which includes a housing that has a bottom wall and a perimeter wall.

Other attempts to solve these and other problems include the following: U.S. Pat. No. 5,490,538, issued to Marcel at al., discloses an automatic rainwater collection device on a downpipe that comprises a branch collar suitable for fitting onto a down pipe and having an orifice coinciding with an orifice in the side of the down pipe, the orifices allowing for the insertion of an elastic scoop which, once in the pipe, will adapt to all or part of the inside of wall of the pipe. U.S. Pat. No. 5,863,151, issued to Chapotelle, discloses a new rainwater saver system using the principle of water following a line of least resistance, the rainwater saver system being for collecting water and redistributing it for various purposes. U.S. Published Patent Application No. 2005/0257433, filed by Dussault et al., discloses a gutter descent assembly designed to collect rainwater falling down a house roof surface.

Still other attempts to solve these and other problems include the following: Japanese patent 11200572 discloses a downpipe for purifying water. Japanese patent 11183236A2 discloses a rainwater storage container with a water level gauge. Japanese patent 11217855A2 discloses a rainwater storage device. Japanese patent 05171752A2 discloses a vertical gutter.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides systems and methods for rainwater collection, irrigation, and water conservation. This technology is ideally used when municipal water reservoirs are low and outdoor watering is restricted. Other comparable uses are also contemplated herein, as will be obvious to those of ordinary skill in the art.

In one exemplary embodiment, the technology provides a rainwater collection, irrigation, and water conservation system, to collect rainwater for subsequent irrigation. The system includes a water holding reservoir. The water holding reservoir is vertically and inconspicuously located adjacent to, yet unconnected to, a downspout of a dwelling and fluidly coupled to a gutter attached to a roof of the dwelling. The water holding reservoir stores collected rainwater received from a gutter portion located upstream in a rainwater flow to the downspout. The water holding reservoir can approximate the shape and size of the downspout. The system also includes a reservoir connector fluidly connected to and located between the water holding reservoir and the gutter. The reservoir connector is inconspicuously located adjacent to a downspout connector. The reservoir connector includes a filter drain to prevent debris from entering the water holding reservoir.

The system also includes a water level indicator fluidly coupled to the water holding reservoir. The water level indicator is externally located and vertically mounted alongside the water holding reservoir. The water level indicator is tubular, clear, and utilizes a portion of the water contained within the water holding reservoir. Thus, the water level indicator is visually indicative of a water level within the vertical water holding reservoir. The system also includes a tubing shut-off valve fluidly connected and located between the water holding reservoir and the water level indicator for selectively activating and deactivating the water level indicator. The system also includes an external volumetric scale, located on the water holding reservoir adjacent to and parallel to the water level indictor, to visually represent and volumetrically quantify the collected rainwater within the water holding reservoir.

The system also includes a water spigot for selectively opening and closing the water holding reservoir. The water spigot is fluidly coupled to the water holding reservoir and located on the water holding reservoir near a base in order to gain a maximum natural gravitational pressure of water located within the water holding reservoir. As the water holding reservoir reaches a full state of collected rainwater, and the water spigot is in a closed position, rainwater flow continues uninterrupted to the downspout.

The system also includes a cleanout drain located at the base of the water holding reservoir. The cleanout drain is located at either an angle to or perpendicular to the water holding reservoir and is generally in a closed position. The cleanout drain includes a removable cap to provide entry to the base of the water holding reservoir. The system also includes a concrete footer located within a ground surface beneath the water holding reservoir. The concrete footer maintains the water holding reservoir in a secure, upright, and vertical position, perpendicular to the ground surface.

In another exemplary embodiment, this system provides a plurality of water holding reservoirs. Each water holding reservoir is vertically and inconspicuously located adjacent to the dwelling and fluidly coupled to the gutter attached to the roof of the dwelling. Each water holding reservoir stores collected rainwater received from a gutter portion located upstream in a rainwater flow to the downspout. The system further includes a reservoir connector fluidly connected to and located between each of the plurality of water holding reservoirs and the gutter. The reservoir connector is inconspicuously located adjacent to a downspout connector, and the reservoir connector is configured to provide rainwater to each of the plurality of water holding reservoirs from a single point in the gutter.

In yet another exemplary embodiment, this technology provides a method for rainwater collection, irrigation, and water conservation, to collect rainwater for subsequent irrigation and ideal use when municipal water reservoirs are low and outdoor watering is restricted. The method includes utilizing a water holding reservoir, locating the water holding reservoir vertically and inconspicuously adjacent to, yet unconnected to, a downspout of a dwelling and fluidly coupling the water holding reservoir to a gutter attached to a roof of the dwelling, and storing collected rainwater received from a gutter portion located upstream in a rainwater flow to the downspout. The water holding reservoir approximates a size of the downspout. The method includes utilizing a reservoir connector, fluidly connecting the reservoir connector to, and placing it between, the water holding reservoir and the gutter, locating the reservoir connector inconspicuously adjacent to a downspout connector. The reservoir connector includes a filter drain to prevent debris from entering the water holding reservoir.

The method also includes utilizing a water level indicator, fluidly coupling the water level indicator to the water holding reservoir, externally locating and vertically mounting the water level indicator alongside the water holding reservoir, the water level indicator being tubular and clear and utilizing a portion of the water contained within the water holding reservoir and being visually indicative of a water level within the vertical water holding reservoir. The method includes utilizing a tubing shut-off valve, fluidly connecting to, and locating between, the water holding reservoir and the water level indicator for selectively activating and deactivating the water level indicator. The method includes utilizing an external volumetric scale, locating the external volumetric scale on the water holding reservoir adjacent to and parallel to the water level indictor, to visually representing and volumetrically quantifying the collected rainwater within the water holding reservoir.

The method also includes utilizing a water spigot for selectively opening and closing the water holding reservoir, fluidly coupling the water spigot to the water holding reservoir and locating the water spigot on the water holding reservoir near a base in order to gain a maximum natural gravitational pressure of water located within the water holding reservoir. Once the water holding reservoir reaches a full state of collected rainwater, and the water spigot is in a closed position, rainwater flow continues uninterrupted to the downspout.

The method also includes utilizing a cleanout drain, locating the cleanout drain at the base of the water holding reservoir at either an angle to or perpendicular to the water holding reservoir and generally in a closed position. A cap to the cleanout drain is removable to provide entry to the base of the water holding reservoir. The method also includes utilizing a concrete footer located within a ground surface beneath the water holding reservoir, maintaining the water holding reservoir in a secure, upright, and vertical position, perpendicular to the ground surface.

In yet another exemplary embodiment, the method includes utilizing a plurality of water holding reservoirs, locating each water holding reservoir vertically and inconspicuously adjacent to the dwelling and fluidly coupling the plurality of water holding reservoirs to the gutter attached to the roof of the dwelling, and storing collected rainwater received from a gutter portion located upstream in a rainwater flow to the downspout. The method also includes utilizing a reservoir connector, fluidly connecting the reservoir connector to and locating the reservoir connector between each of the plurality of water holding reservoirs and the gutter, locating the reservoir connector inconspicuously adjacent to a downspout connector, and configuring the reservoir connector to provide rainwater to each of the plurality of water holding reservoirs from a single point in the gutter.

In still yet another exemplary embodiment, this technology provides a rainwater collection, irrigation, and water conservation device, to collect rainwater for subsequent irrigation and ideal use when municipal water reservoirs are low and outdoor watering is restricted. The device includes a reservoir connector for use with a section of conventional thermoplastic polymer pipe which is mounted vertically and inconspicuously adjacent to a dwelling, to serve as a water holding reservoir. The reservoir connector is fluidly and sealably connected to and located between the conventional thermoplastic polymer pipe and a gutter attached to a roof of the dwelling. The reservoir connector is configured to receive rainwater from a gutter portion located upstream in a rainwater flow to a downspout.

The device also includes a reservoir base sealably placed at an end of the conventional thermoplastic polymer pipe closest to a ground surface area to allow the conventional thermoplastic polymer pipe to retain collected rainwater.

The device also includes a water level indicator fluidly coupled to the conventional thermoplastic polymer pipe, externally located and vertically mounted alongside the conventional thermoplastic polymer pipe. The water level indicator is clear and utilizes a portion of the water contained within the conventional thermoplastic polymer pipe serving as a water holding reservoir and is visually indicative of a water level contained within. The device also includes a tubing shut-off valve fluidly connected and located between the thermoplastic polymer pipe and the water level indicator for selectively activating and deactivating the water level indicator. The device also includes an external volumetric scale, located on the thermoplastic polymer pipe adjacent to and parallel to the water level indictor, to visually represent and volumetrically quantify the collected rainwater within the water holding reservoir.

The device further includes a water spigot located on the reservoir base for selectively opening and closing water access to the conventional thermoplastic polymer pipe serving as a water holding reservoir. The device also includes a cleanout drain located on the reservoir base at either an angle to or perpendicular to the reservoir base and generally in a closed position, wherein a cap to the cleanout drain is removable to provide entry. The device further includes a concrete footer located within a ground surface beneath the conventional thermoplastic polymer pipe serving as a water holding reservoir and the reservoir base. The concrete footer maintains the conventional thermoplastic polymer pipe and the reservoir base in a secure, upright, and vertical position, perpendicular to the ground surface.

Advantageously, this technology provides systems and methods for rainwater collection, irrigation, and water conservation that are ideal for drought-stricken areas. For example, many geographical areas supplied by municipal water reservoirs sources undergo watering bans and/or restrictions each summer due to the lack of rainfall. This technology is ideally used when these municipal water reservoirs are low and outdoor watering is either restricted or banned altogether. This technology provides an alternate water source during such times. Even when no drought conditions exist, this technology is still useful in providing water conservation. Additionally, this technology provides a rainwater collection, irrigation, and water conservation system that does not require pumps, a power source, sprinklers, etc. The system works complementarily with existing gutters and downspouts and utilizes a tall, narrow water holding reservoir to gain the benefit of gravity for the distribution of stored water.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like system components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides systems and methods to for rainwater collection, irrigation, and water conservation. This technology is ideal for use when municipal water reservoirs are low and outdoor watering is restricted or altogether banned. Other comparable uses are also contemplated herein, as will be obvious to those of ordinary skill in the art.

Figure 1:
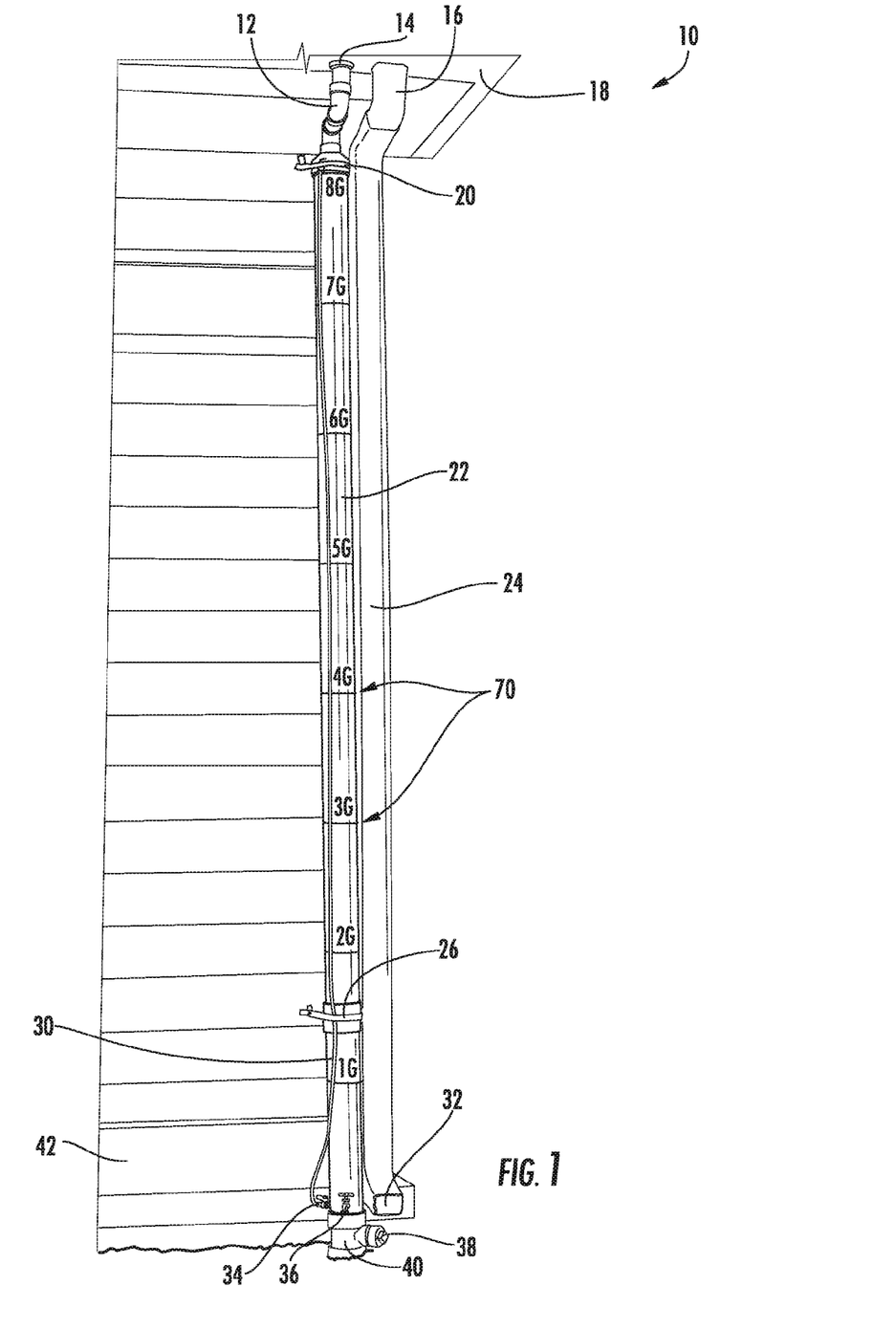
FIG. 1 is a front perspective view of a rainwater collection, irrigation, and conservation system, according to an embodiment of the technology described herein, illustrating, in particular, a water holding reservoir, water level indicator, and reservoir connector.

Referring now to FIG. 1, a rainwater collection, irrigation, and conservation system 10 is shown. The system 10 is designed to collect rainwater for subsequent irrigation and ideal use when municipal water reservoirs are low and outdoor watering is restricted. The system 10 includes a water holding reservoir 22. The water holding reservoir 22 is located vertically and inconspicuously adjacent to, yet unconnected to, an existing downspout 24, downspout connector 16, and downspout drain 32 of a dwelling 42. Alternatively, the water holding reservoir 22 is mounted in other locations not adjacent to an existing downspout 24. Alternatively, the water holding reservoir 22 spans a height greater than a single story of a dwelling, such as, for example, a two-story building. The water holding reservoir 22, in one embodiment, is a conventional thermoplastic polymer pipe. However, alternative materials suitable for the flow and storage of water are used in other embodiments.

The water holding reservoir 22 is fluidly coupled to a rain gutter 18 attached to a roof of the dwelling 42 with a reservoir connector 12. Preferably, the coupling to the rain gutter 18 is located at a portion of the rain gutter 18 upstream in a rainwater flow to the downspout 24. Thus, upon the water holding reservoir 22 reaching a full state of collected rainwater, rainwater flow continues uninterrupted to the existing downspout 24. The coupling to the rain gutter 18 also includes the use of a gasket 14 to sealably connect the reservoir connector 12 to the rain gutter 18. In one embodiment, the water holding reservoir 22 is mounted to the dwelling 42 with an upper mounting bracket 20 and a lower mounting bracket 26. It will be understood in the art that there are many options and methods by which the water holding reservoir 22 is secured to the dwelling 42 or is placed adjacent to the dwelling 42.

The system 10 also includes a water level indicator 30. The water level indicator 30 is fluidly coupled to the water holding reservoir 22 at a tubing shut-off valve 34 for the water level indicator 30 that is fluidly connected to and located between the water holding reservoir 22 and the water level indicator 30 for selectively activating and deactivating the water level indicator 30. The water level indicator 30 is externally located and vertically mounted alongside the water holding reservoir 22. The water level indicator 30 is tubular and clear, utilizing a portion of the water contained within the water holding reservoir 22 thereby providing visual indication as to the water level within the vertical water holding reservoir 22 along external volumetric scale 70.

The system 10 also includes a water spigot 36 for selectively opening and closing the water holding reservoir 22, allowing stored water to be available for use with in watering lawns, gardens, and the like. The water spigot 36 is fluidly coupled to the water holding reservoir 22 and located on the water holding reservoir 22 near the ground surface. This specific placement of the water spigot 36 along the base of the water holding reservoir 22 near the ground surface provides the benefit of using a maximum natural gravitational pressure of water located within the water holding reservoir 22 for water distribution. The water spigot is known in the art and is commercially available.

The system 10 also includes a cleanout drain 38 located at the base 40 of the water holding reservoir 22 at either an angle to or perpendicular to the water holding reservoir 22 and generally in a closed position. The cleanout drain 38 includes a removable cap to provide entry to the base of the water holding reservoir 22. Although the system 10 utilizes a filter drain between the rain gutter 18 and the reservoir connector 12 to limit the debris that enters into the water holding reservoir 22, as shown with element 66 in FIG. 8, some small debris may collect at the reservoir base 40 that ultimately needs to be removed to ensure proper use of the system 10.

Figure 2:
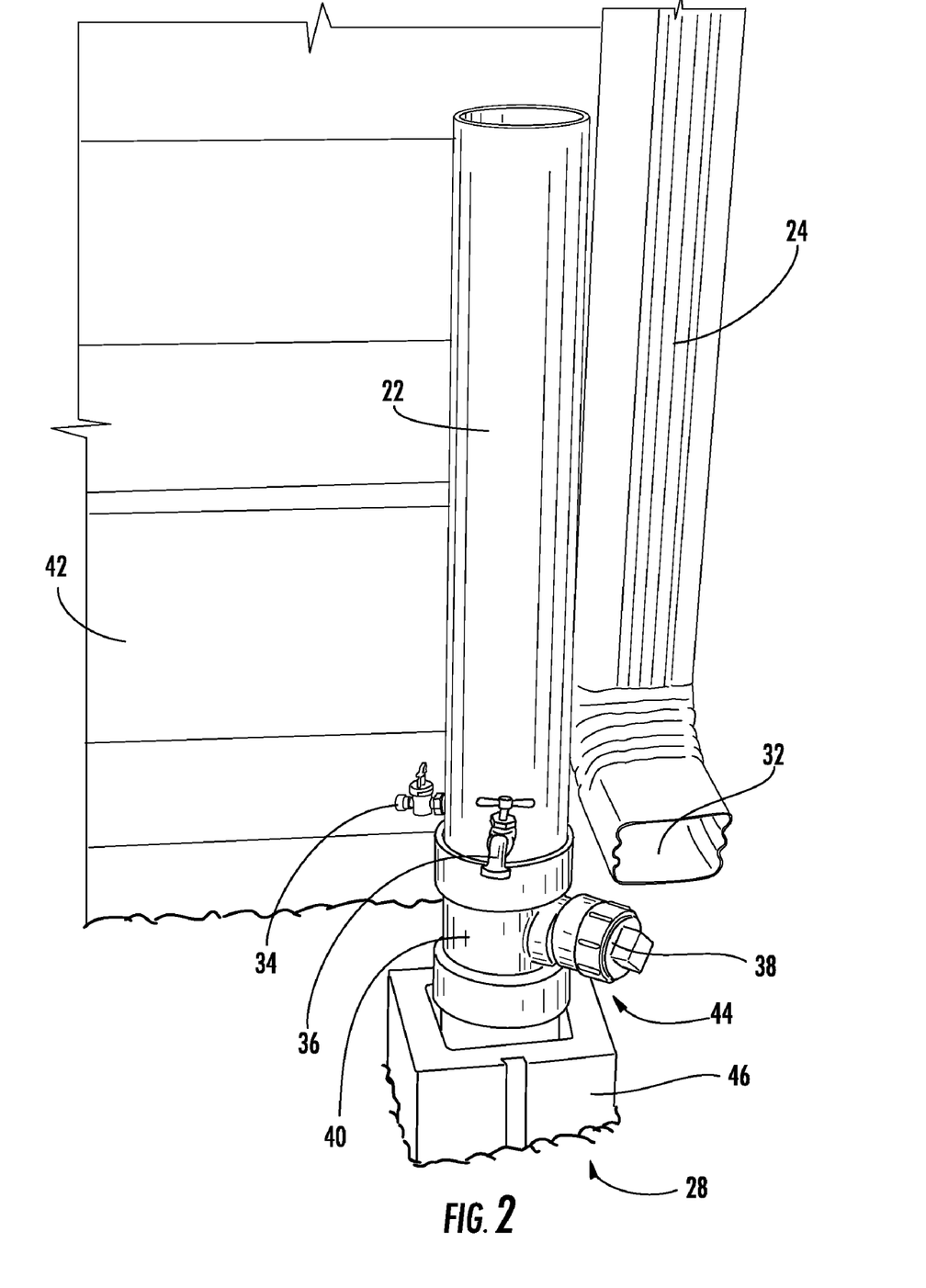
FIG. 2 is a front perspective view of a rainwater collection, irrigation, and conservation system, illustrating, in particular, a water holding reservoir, a reservoir base, and a concrete footer.

Referring now to FIG. 2, the rainwater collection, irrigation, and conservation system 10 of FIG. 1 is shown. The water holding reservoir 22 is located vertically and inconspicuously adjacent, yet unconnected, to an existing downspout 24 and downspout drain 32 of a dwelling 42. The system includes a concrete footer 46 located within a ground surface 28 beneath the water holding reservoir 22, reservoir base 40, and the base drain assembly 44. The concrete footer 46 is shown during installation of the system 10. The concrete footer 46 maintains the water holding reservoir 22 and reservoir base 40 in a secure, upright, and vertical position, perpendicular to the ground surface 28.

The system 10 is shown with a cleanout drain 38 located perpendicularly at the reservoir base 40 of the water holding reservoir 22. Located on the water holding reservoir 22 near the reservoir base 40 is the water spigot 36 for selectively opening and closing the water holding reservoir 22, allowing stored water to be available for use watering lawns, gardens, and the like. The water spigot 36 is fluidly coupled to the water holding reservoir 22 and located on the water holding reservoir 22 near the ground surface 28. Also located on the water holding reservoir 22 near the reservoir base 40 is the tubing shut-off valve 34 for the water level indicator 30 that is fluidly connected to and located between the water holding reservoir 22 and the water level indicator 30 (FIG. 1) for selectively activating and deactivating the water level indicator 30.

Figure 3:
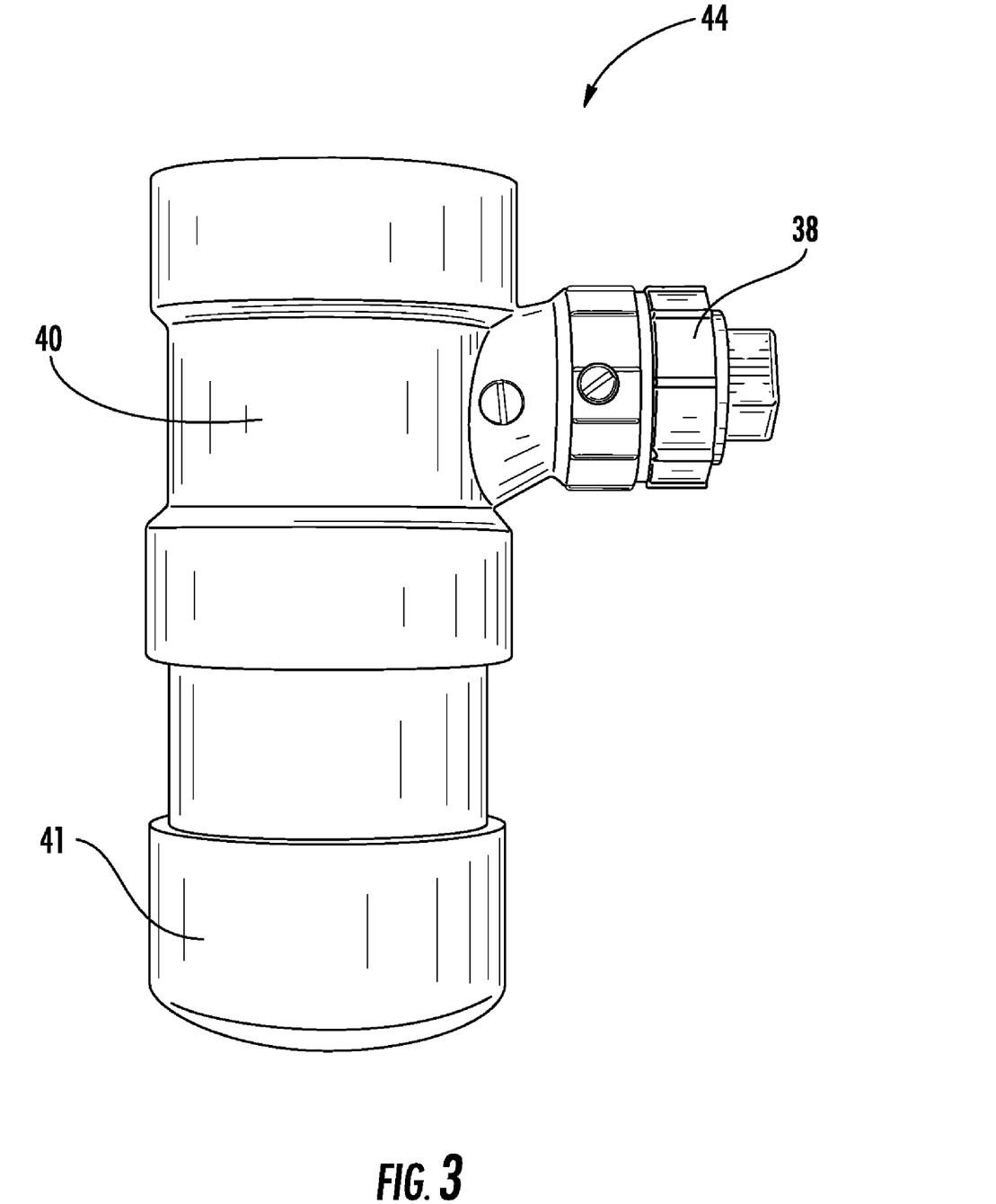
FIG. 3 is a front perspective view of a reservoir base drain assembly, according to an embodiment of the technology described herein, illustrating, in particular, a water holding reservoir base cap and a cleanout drain.

Referring now to FIG. 3, a reservoir base drain assembly 44 is shown. The reservoir base drain assembly 44 is located at the base of the rainwater collection, irrigation, and conservation system 10 of FIG. 1. The reservoir base drain assembly 44 includes a reservoir base 40, reservoir base end cap 41, and a cleanout drain 38. The clean out drain 38 is shown perpendicularly located at the reservoir base 40 of the water holding reservoir 22. In an alternative embodiment, the clean out drain 38 is located at an angle to the reservoir base 40 of the water holding reservoir 22. The cleanout drain 38 includes a removable cap to provide entry to the base of the water holding reservoir 22. The reservoir base end cap 41 seals the reservoir base 40, enabling the water holding reservoir 22 to retain water.

Figure 4:
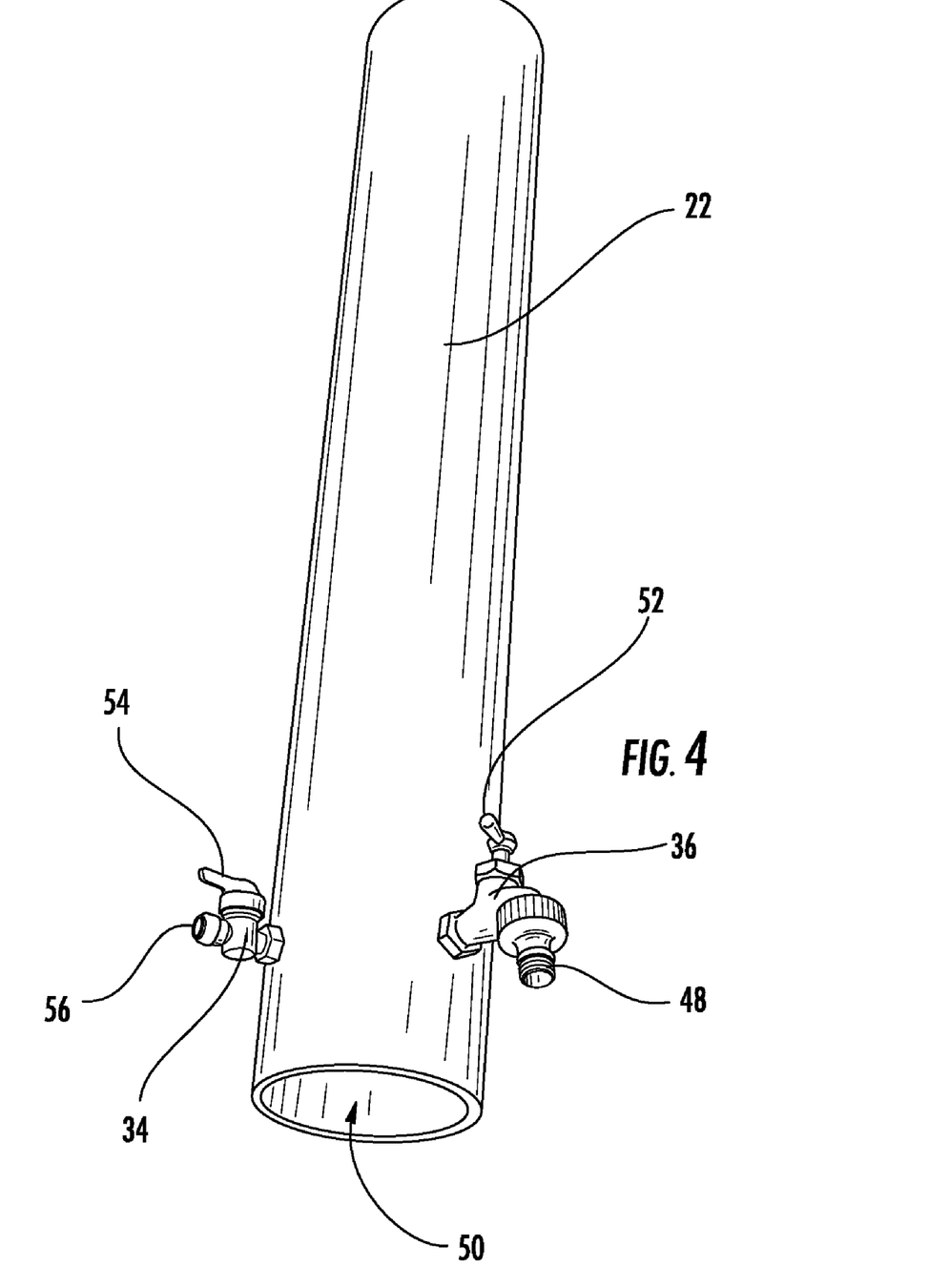
FIG. 4 is a front perspective view of a water holding reservoir, water spigot, and shut-off valve for the water level indicator.

Referring now to FIG. 4, the water holding reservoir 22 of FIGS. 1 and 2 is shown. The interior portion 50 of the water holding reservoir 22 provides storage space for collected rainwater. Once rainwater is retained within the water holding reservoir 22, the collected rainwater is available for exit from the water spigot 36. The water spigot 36 allows one to selectively open and close the water holding reservoir 22, allowing stored water to be available for use with in watering lawns, gardens, and the like.

The water spigot 36 is fluidly coupled to the water holding reservoir 22 and located on the water holding reservoir 22 near the ground surface. This specific placement of the water spigot 36 along the base of the water holding reservoir 22 near the ground surface provides the benefit of using a maximum natural gravitational pressure of water located within the water holding reservoir 22 for water distribution. The water spigot 36 includes a water spigot shut-off valve 52 that is manually turned by a user in order to regulate the flow of collected rainwater. The water spigot 36 also includes a garden hose adapter 48 for connectivity to a standard garden hose for outdoor watering.

Once rainwater is retained within the water holding reservoir 22, the collected rainwater also is available for exit from the tubing shut-off valve 34 for the water level indicator 30. The tubing shut-off valve 34 for the water level indicator 30 provides fluid connectivity between the water holding reservoir 22 and the water level indicator 30. The tubing shut-off valve 34 for the water level indicator 30 includes a lever 54, operative to open and close the tubing shut-off valve 34. Additionally, tubing shut-off valve 34 includes a tubing adapter 56 to connect to the water level indicator 30. As water exits the water holding reservoir 22, while tubing shut-off valve 34 remains in an open position, it fills the water level indicator 30 and, external to the water holding reservoir 22, provides a visual indication of the amount of water within the water holding reservoir 22.

Figure 5:
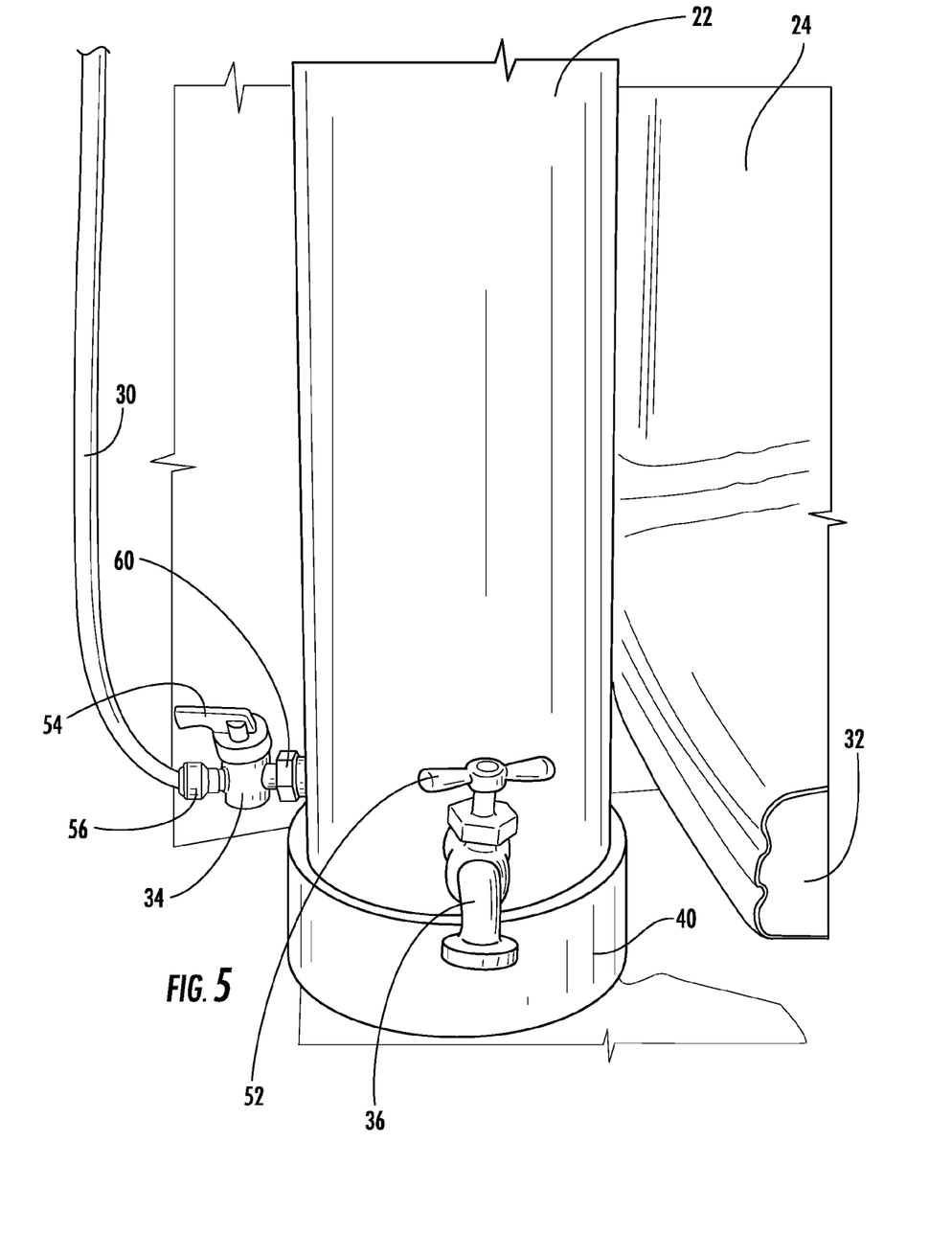
FIG. 5 is a front perspective view of a water holding reservoir, water spigot, water level indicator adjacent to an existing downspout, and shut-off valve for the water level indicator.
Figure 6:
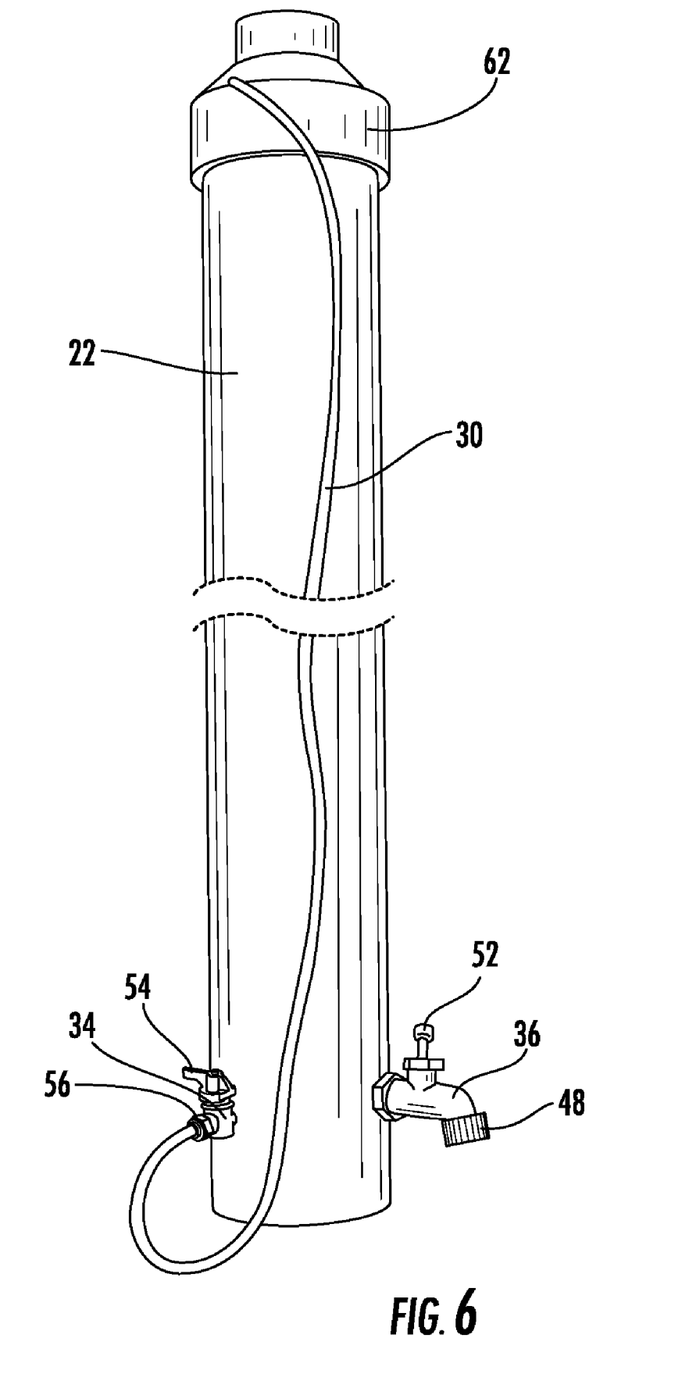
FIG. 6 is a front perspective view of a water holding reservoir, water spigot, shut-off valve, water level indicator, shut-off valve for the water level indicator hose adapter, and reservoir coupling.
Figure 7:
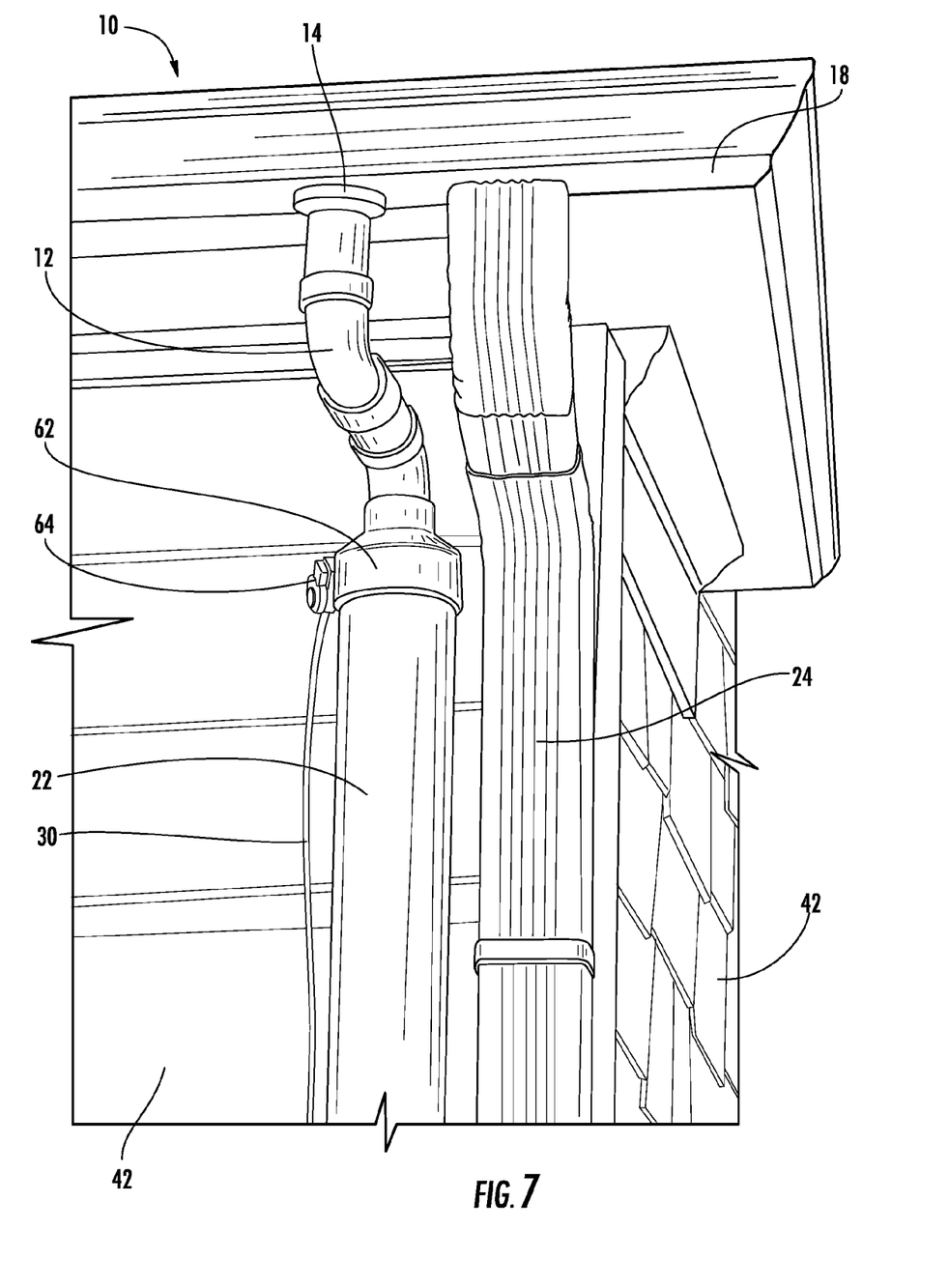
FIG. 7 is a front perspective view of a water holding reservoir, reservoir coupling, reservoir connector, and water level indicator all in relation to an existing dwelling overhand, gutter, and downspout.

Referring now to FIGS. 5, 6, and 7, the rainwater collection, irrigation, and conservation system 10 of FIG. 1 is shown. The system includes a water holding reservoir 22 located vertically and inconspicuously adjacent, yet unconnected, to an existing downspout 24 and downspout drain 32 of a dwelling 42. Alternatively, the water holding reservoir 22 is mounted in other locations not adjacent to an existing downspout. The water holding reservoir 22 includes a reservoir coupling to connect the water holding reservoir 22 to the reservoir connector 12 (FIG. 1). The water holding reservoir 22 is fluidly coupled to a rain gutter 18 attached to a roof of the dwelling 42 with a reservoir connector 12. Preferably, the coupling to the rain gutter 18 is located at a portion of the rain gutter 18 upstream in a rainwater flow to the downspout 24. Thus, upon the water holding reservoir 22 reaching a full state of collected rainwater, rainwater flow continues uninterrupted to the existing downspout 24. The coupling to the rain gutter 18 also includes the use of a gasket 14 to sealably connect the reservoir connector 12 to the rain gutter 18.

The system 10 includes a water spigot 36 for selectively opening and closing the water holding reservoir 22, allowing stored water to be available for subsequent use. The water spigot 36 is fluidly coupled to the water holding reservoir 22 and located on the water holding reservoir 22 near the reservoir base 40 just above ground surface.

The system also includes a tubing shut-off valve 34 for the water level indicator 30. Once rainwater is retained within the water holding reservoir 22, the collected rainwater also is available for exit from tubing shut-off valve 34. The tubing shut-off valve 34 provides fluid connectivity between the water holding reservoir 22 and the water level indicator 30 as connected by the shut-off valve connector 60. The tubing shut-off valve 34 includes a lever 54, operative to open and close the tubing shut-off valve 34. Additionally, the tubing shut-off valve 34 includes a tubing adapter 56 to connect to the tubing of the water level indicator 30. As water exits the water holding reservoir 22, while the tubing shut-off valve 34 remains in an open position, it fills the tubing of the water level indicator 30 and, external to the water holding reservoir 22, provides a visual indication of the amount of water within the water holding reservoir 22.

Figure 8:
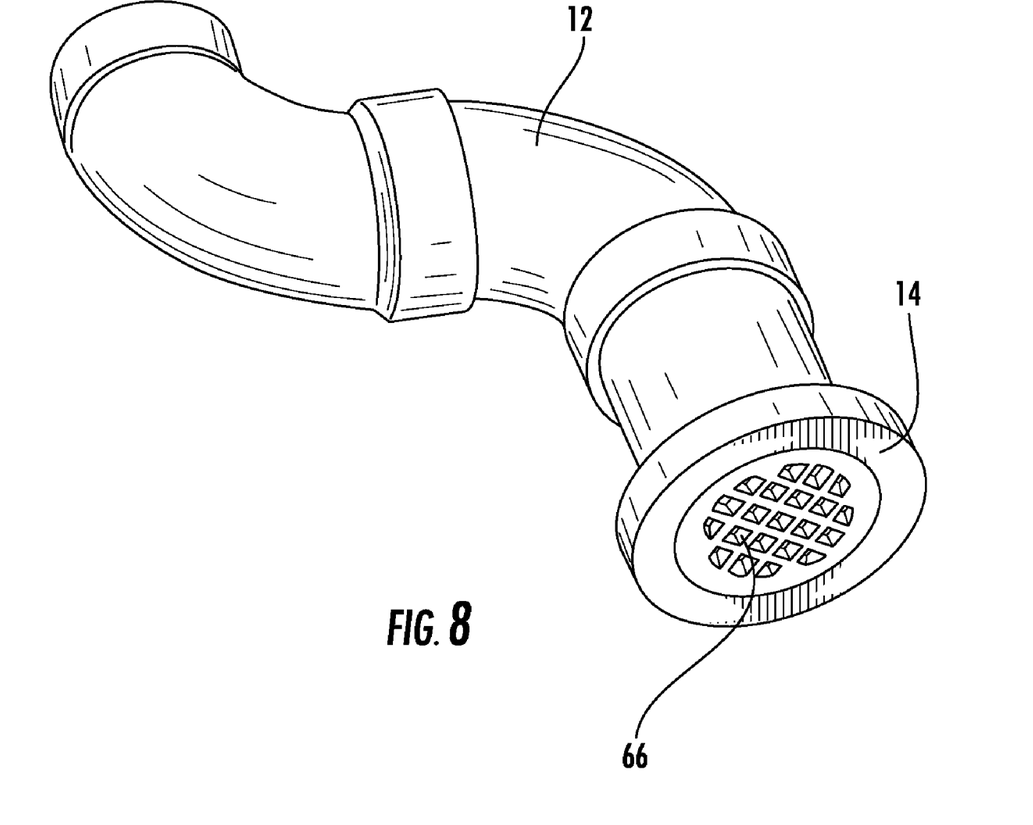
FIG. 8 is a perspective view of a reservoir connector, illustrating, in particular, a filter drain, according to an embodiment of the technology described herein.
Figure 9:
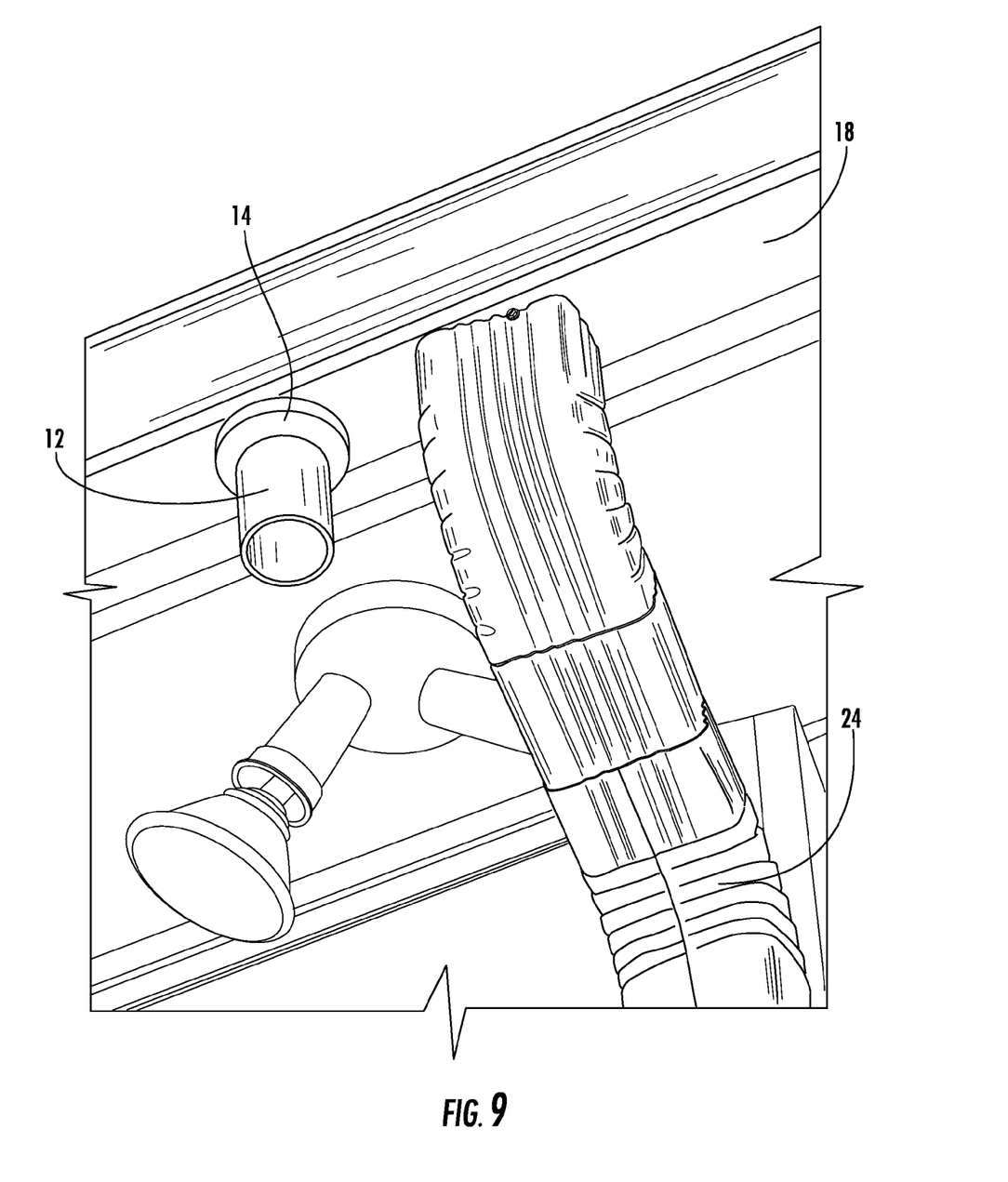
FIG. 9 is a perspective view of a portion of the reservoir connector and a gasket connecting the reservoir connector and filter drain to a gutter, according to an embodiment of the technology described herein.

Referring now to FIGS. 8 and 9, a reservoir connector 12 is shown. The reservoir connector 12 is used to fluidly couple the water holding reservoir 22 to a rain gutter 18 attached to a roof of the dwelling 42. The reservoir connector 12, in one embodiment, is comprised conventional thermoplastic polymer pipe material. However, alternative materials suitable for the contained flow of water are used in other embodiments. The reservoir connector 12 includes a gasket 14 and a filter drain 66. The gasket 14 sealably connects the reservoir connector 12 to the rain gutter 18. The filter drain 66 is provided to limit the amount of debris that attempts to enter the water holding reservoir 22 with the flow of rainwater in the rain gutter 18.

Figure 10:
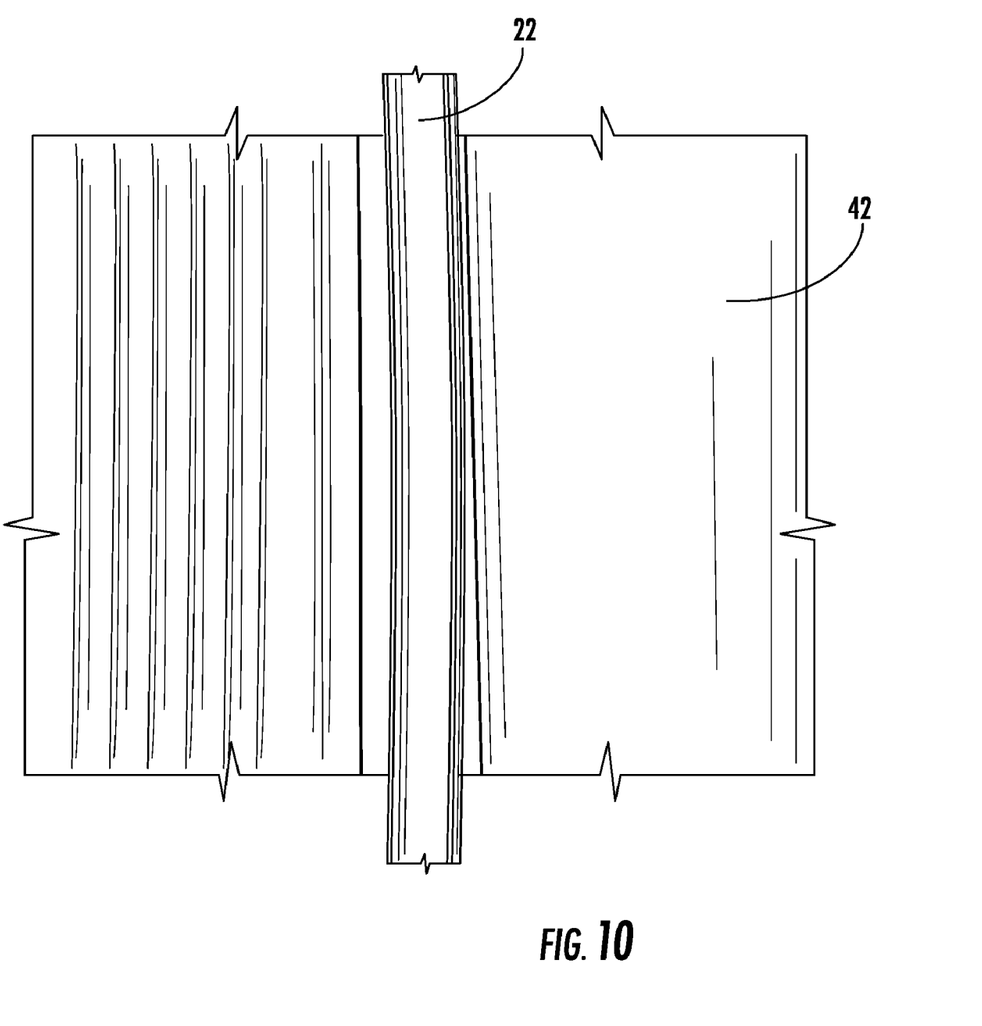
FIG. 10 is a front perspective view of a water holding reservoir placed in front of a dwelling.

Referring now to FIG. 10, a water holding reservoir 22 is shown. The water holding reservoir 22 is shown in front of a dwelling 42. The water holding reservoir 22 is located vertically and perpendicular to the ground surface.

Figure 11:
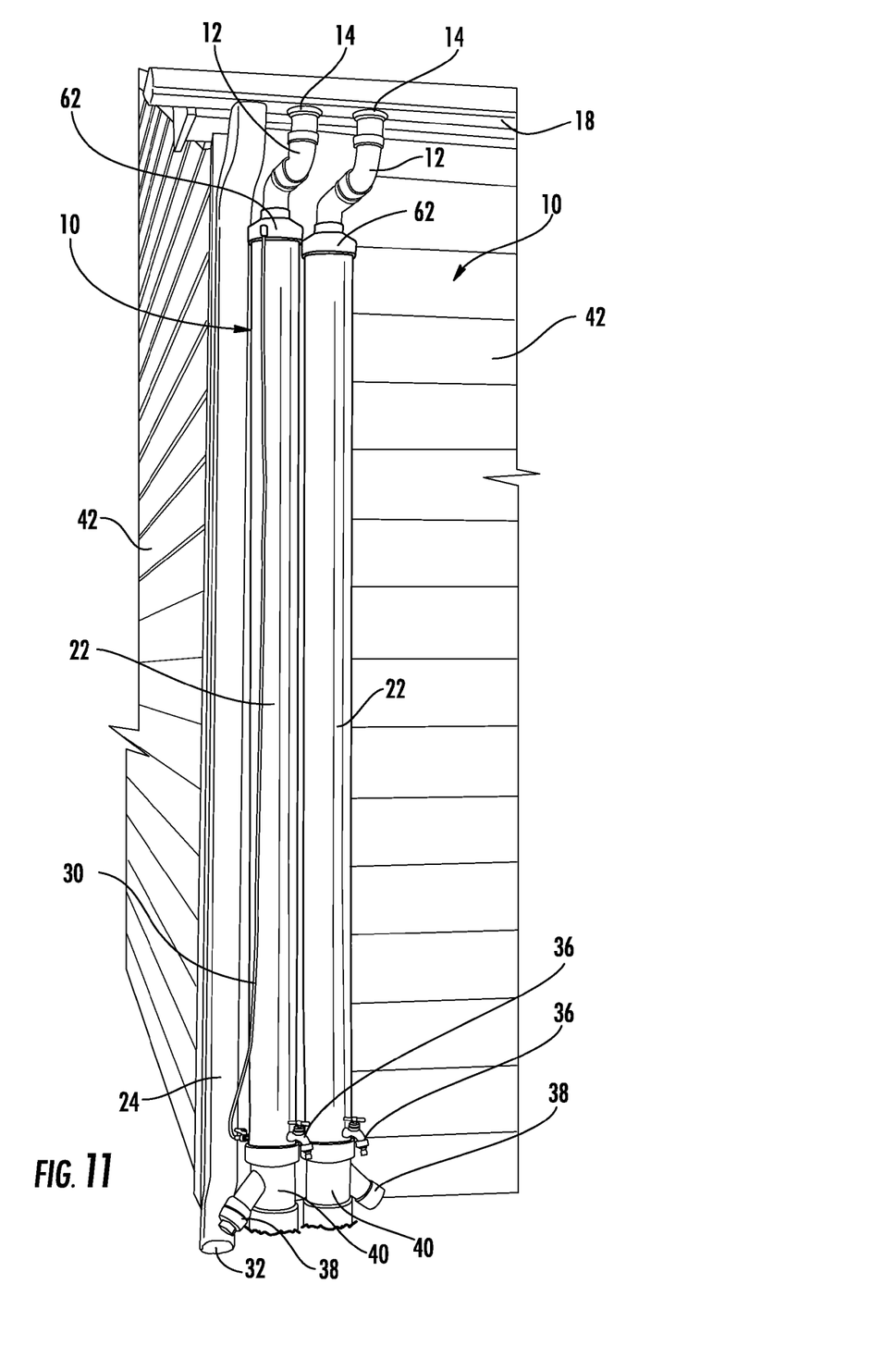
FIG. 11 is a front perspective view of a pair of rainwater collection, irrigation, and conservation systems, according to an embodiment of the technology described herein.

Referring now to FIG. 11, the rainwater collection, irrigation, and conservation system 10 of FIG. 1 is shown in an alternative embodiment wherein two or more systems 10 are used. This embodiment includes a plurality of water holding reservoirs 22, each water holding reservoir 22 being vertically and inconspicuously located adjacent to the dwelling 42 and fluidly coupled to the gutter 18 attached to the roof of the dwelling 42, to store collected rainwater received from a gutter 18 portion located upstream in a rainwater flow to an existing downspout 24. This embodiment provides for additional water storage and additional water spigots 36 from which to draw stored water. Each water holding reservoir 22 includes a water level indicator 30 to visually indicate the water level. In this embodiment each water holding reservoir 22 utilizes its own reservoir connector 12 to connect to the gutter 18. In other embodiments, various combinations, quantities, and sizes of water holding reservoirs 22 are used to meet the watering needs at a particular location.

Alternatively, a reservoir connector 12 is fluidly connected to and located between each of the plurality of water holding reservoirs 22 and the gutter 18, the reservoir connector 12 configured to provide rainwater to each of the plurality of water holding reservoirs 22 from a single point in the gutter 18.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A rainwater collection, irrigation, and water conservation system, to collect rainwater for subsequent irrigation and ideal use when municipal water reservoirs are low and outdoor watering is restricted, the system comprising:

a water holding reservoir, vertically located adjacent, yet unconnected, to a downspout of a dwelling, placed generally along a height of the downspout defined between a bottom and a top of the downspout, the water holding reservoir constructed in a narrow vertical size and elongated shape generally that of the downspout to which it is adjacent, having generally a same height and a consistent width from the bottom to the top of the downspout, and fluidly, and with no valve, coupled to a gutter attached to a roof of the dwelling, to store collected rainwater received from a gutter portion located upstream in a rainwater flow to the downspout;

a water level indicator fluidly coupled to the water holding reservoir, externally located and vertically mounted alongside the water holding reservoir, the water level indicator extending the height from a bottom to a top of the water holding reservoir, the water level indicator being tubular and clear and utilizing a portion of the water contained within the water holding reservoir and being visually indicative of a water level within the vertical water holding reservoir;

a shut-off valve fluidly connected and located between the water holding reservoir and the water level indicator for selectively activating and deactivating the water level indicator a water spigot for selectively opening and closing the water holding reservoir, the water spigot being fluidly coupled to the water holding reservoir and located on the water holding reservoir near a base in order to gain a maximum natural gravitational pressure of water located within the water holding reservoir;

a cleanout drain located below both the shut-off valve and the water spigot and at the base of the water holding reservoir at either an angle to or perpendicular to the water holding reservoir and generally in a closed position; and a removable cap to the cleanout drain to provide entry to the base of the water holding reservoir and wherein, upon the water holding reservoir reaching a full state of collected rainwater and the water spigot is in a closed position, rainwater flow continues uninterrupted to the downspout.

2. The rainwater collection, irrigation, and water conservation system of claim 1, the system further comprising:

a reservoir connector fluidly connected to and located between the water holding reservoir and the gutter, the reservoir connector being inconspicuously located adjacent to a downspout connector; and a filter drain, located within the reservoir connector, to prevent debris from entering the water holding reservoir.

3. The rainwater collection, irrigation, and water conservation system of claim 1, the system further comprising:

a concrete footer located within a ground surface beneath the water holding reservoir, wherein the concrete footer maintains the water holding reservoir in a secure, upright, and vertical position, perpendicular to the ground surface.

4. The rainwater collection, irrigation, and water conservation system of claim 1, the system further comprising:

an external volumetric scale, located on the water holding reservoir adjacent to and parallel to the water level indictor, to visually represent and volumetrically quantify the collected rainwater within the water holding reservoir.

5. The rainwater collection, irrigation, and water conservation system of claim 1, the system further comprising:

a plurality of water holding reservoirs, each water holding reservoir being vertically and inconspicuously located adjacent to the dwelling and fluidly coupled to the gutter attached to the roof of the dwelling, to store collected rainwater received from a gutter portion located upstream in a rainwater flow to the downspout.

6. The rainwater collection, irrigation, and water conservation system of claim 5, the system further comprising:

a reservoir connector fluidly connected to and located between each of the plurality of water holding reservoirs and the gutter, the reservoir connector being inconspicuously located adjacent to a downspout connector, and the reservoir connector configured to provide rainwater to each of the plurality of water holding reservoirs from a single point in the gutter.

7. A method for rainwater collection, irrigation, and water conservation, to collect rainwater for subsequent irrigation and ideal use when municipal water reservoirs are low and outdoor watering is restricted, the system comprising:

locating a water holding reservoir vertically adjacent to, yet unconnected to, a downspout of a dwelling, placing the water holding reservoir along a height of the downspout defined between a bottom and a top of the downspout, the water holding reservoir constructed in a narrow vertical size and elongated shape generally that of the downspout to which it is adjacent, having generally a same height and a consistent width from the bottom to the top of the downspout, and fluidly, and with no valve, coupling the water holding reservoir to a gutter attached to a roof of the dwelling and storing collected rainwater received from a gutter portion located upstream in a rainwater flow to the downspout;

utilizing a water level indicator, fluidly coupling the water level indicator to the water holding reservoir, externally locating and vertically mounting the water level indicator alongside the water holding reservoir, the water level indicator extending the height from a bottom to a top of the water holding reservoir, the water level indicator being tubular and clear and utilizing a portion of the water contained within the water holding reservoir and being visually indicative of a water level within the vertical water holding reservoir;

utilizing a shut-off valve, fluidly connecting to, and locating between, the water holding reservoir and the water level indicator for selectively activating and deactivating the water level indicator utilizing a water spigot for selectively opening and closing the water holding reservoir, fluidly coupling the water spigot to the water holding reservoir and locating the water spigot on the water holding reservoir near a base in order to gain a maximum natural gravitational pressure of water located within the water holding reservoir;

utilizing a cleanout drain, locating the cleanout drain below both the shut-off valve and the water spigot and at the base of the water holding reservoir at either an angle to or perpendicular to the water holding reservoir and generally in a closed position, wherein a cap to the cleanout drain is removable to provide entry to the base of the water holding reservoir and wherein, upon the water holding reservoir reaching a full state of collected rainwater and the water spigot being in a closed position, rainwater flow continues uninterrupted to the downspout.

8. The method for rainwater collection, irrigation, and water conservation of claim 7, further comprising:

utilizing a reservoir connector, fluidly connecting the reservoir connector to, and placing it between, the water holding reservoir and the gutter, locating the reservoir connector inconspicuously adjacent to a downspout connector; and utilizing a filter drain, locating it within the reservoir connector, preventing debris from entering the water holding reservoir.

9. The method for rainwater collection, irrigation, and water conservation of claim 7, further comprising:

utilizing a concrete footer located within a ground surface beneath the water holding reservoir, maintaining the water holding reservoir in a secure, upright, and vertical position, perpendicular to the ground surface.

10. The method for rainwater collection, irrigation, and water conservation of claim 7, further comprising:

utilizing an external volumetric scale, locating the external volumetric scale on the water holding reservoir adjacent to and parallel to the water level indictor, to visually representing and volumetrically quantifying the collected rainwater within the water holding reservoir.

11. The method for rainwater collection, irrigation, and water conservation of claim 7, further comprising:

utilizing a plurality of water holding reservoirs, locating each water holding reservoir vertically and inconspicuously adjacent to the dwelling and fluidly coupling the plurality of water holding reservoirs to the gutter attached to the roof of the dwelling, and storing collected rainwater received from a gutter portion located upstream in a rainwater flow to the downspout.

12. The method for rainwater collection, irrigation, and water conservation of claim 11, further comprising:
utilizing a reservoir connector, fluidly connecting the reservoir connector to and locating the reservoir connector between each of the plurality of water holding reservoirs and the gutter, locating the reservoir connector inconspicuously adjacent to a downspout connector, and configuring the reservoir connector to provide rainwater to each of the plurality of water holding reservoirs from a single point in the gutter.

13. A rainwater collection, irrigation, and water conservation device, to collect rainwater for subsequent irrigation and ideal use when municipal water reservoirs are low and outdoor watering is restricted, the device comprising:
a reservoir connector for use with a section of conventional thermoplastic polymer pipe which is mounted vertically adjacent to a downspout of a dwelling, placed generally along a height of the downspout defined between a bottom and a top of the downspout, the water holding reservoir constructed in a narrow vertical size and elongated shape generally that of the downspout to which it is adjacent, having generally a same height and a consistent width from the bottom to the top of the downspout, to serve as a water holding reservoir, the reservoir connector fluidly and sealably, and with no valve, connected to and located between the conventional thermoplastic polymer pipe and a gutter attached to a roof of the dwelling, the reservoir connector configured to receive rainwater from a gutter portion located upstream in a rainwater flow to a downspout;
a reservoir base sealably placed at an end of the conventional thermoplastic polymer pipe closest to a ground surface area to allow the conventional thermoplastic polymer pipe to retain collected rainwater;
a water level indicator fluidly coupled to the conventional thermoplastic polymer pipe, externally located and vertically mounted alongside the conventional thermoplastic polymer pipe, the water level indicator extending the height from a bottom to a top of the conventional thermoplastic polymer pipe, the water level indicator being clear and utilizing a portion of the water contained within the conventional thermoplastic polymer pipe serving as a water holding reservoir and being visually indicative of a water level contained within;
a shut-off valve fluidly connected and located between the thermoplastic polymer pipe and the water level indicator for selectively activating and deactivating the water level indicator
a water spigot located near the reservoir base for selectively opening and closing water access to the conventional thermoplastic polymer pipe serving as a water holding reservoir; and
a cleanout drain located below both the shut-off valve and the water spigot and on the reservoir base at either an angle to or perpendicular to the reservoir base and generally in a closed position, wherein a cap to the cleanout drain is removable to provide entry.

14. The rainwater collection, irrigation, and water conservation device of claim 13, further comprising:
a concrete footer located within a ground surface beneath the conventional thermoplastic polymer pipe serving as a water holding reservoir and the reservoir base, wherein the concrete footer maintains the conventional thermoplastic polymer pipe and the reservoir base in a secure, upright, and vertical position, perpendicular to the ground surface; and
an external volumetric scale, located on the thermoplastic polymer pipe adjacent to and parallel to the water level indictor, to visually represent and volumetrically quantify the collected rainwater within the water holding reservoir.

* * * * *